United States Patent [19]
Kawai et al.

[11] 3,827,841
[45] Aug. 6, 1974

[54] EXTRUSION APPARATUS FOR USE IN THE PRODUCTION OF THERMOPLASTIC RESIN FOAMS

[75] Inventors: Isami Kawai, Ageo; Atsuro Nishikawa, Osaka; Akira Iwata, Osaka; Kohei Sugiyama, Osaka, all of Japan

[73] Assignee: Sekisui Kagaku Kogyo Kabushiki Kaisha, Osaka, Japan

[22] Filed: June 22, 1970

[21] Appl. No.: 47,980

[52] U.S. Cl.............. 425/4 C, 259/9, 264/51, 425/208, 425/817 C
[51] Int. Cl............................................ B29d 27/00
[58] Field of Search........... 18/12 SE, 12 SJ, 12 SN, 18/12 SS, 12 TT; 425/4, 4 C, 817, 817 C, 208; 264/51, 53, 328, 329; 259/5, 9, 104, 191

[56] References Cited
UNITED STATES PATENTS

| 3,160,688 | 12/1964 | Aykanian et al. | 18/12 SN X |
| 3,391,051 | 7/1968 | Ehrenfreund et al. | 18/12 SN X |
| 3,431,599 | 3/1969 | Fogelberg | 18/12 SN |

Primary Examiner—R. Spencer Annear
Assistant Examiner—Mark Rosenbaum
Attorney, Agent, or Firm—Sherman and Shalloway

[57] ABSTRACT

An extrusion apparatus including an extruder comprising an extruder barrel, an extruder screw and an injection port for blowing agent and a cooling device connected to the forward end of said extruder, said extruder screw consisting of a compression zone wherein a volume in unit pitch of the screw decreases progressively in the extrusion direction and a metering zone wherein a volume in unit pitch of the screw is 1.6 – 2.0 times a volume in the final unit pitch of the screw in the compression zone and is constant in the extrusion direction, said injection port being provided above the metering zone, and said cooling device consisting of a coolant vessel disposed coaxially with said extruder, a plurality of pipes in said coolant vessel for dividing the flow of resin spaced apart from each other, an adapter for conducting the flow of resin from said extruder to said pipes, and an adapter for gathering the divided flows of resin extruded from said pipes.

6 Claims, 13 Drawing Figures

EXTRUSION APPARATUS FOR USE IN THE PRODUCTION OF THERMOPLASTIC RESIN FOAMS

This invention relates to an extrusion apparatus for use in the production of thermoplastic resin foams, and more particularly, to an extruder suited for extruding and foaming thermoplastic resins and a cooling device connected to the extruder.

Figure 8:
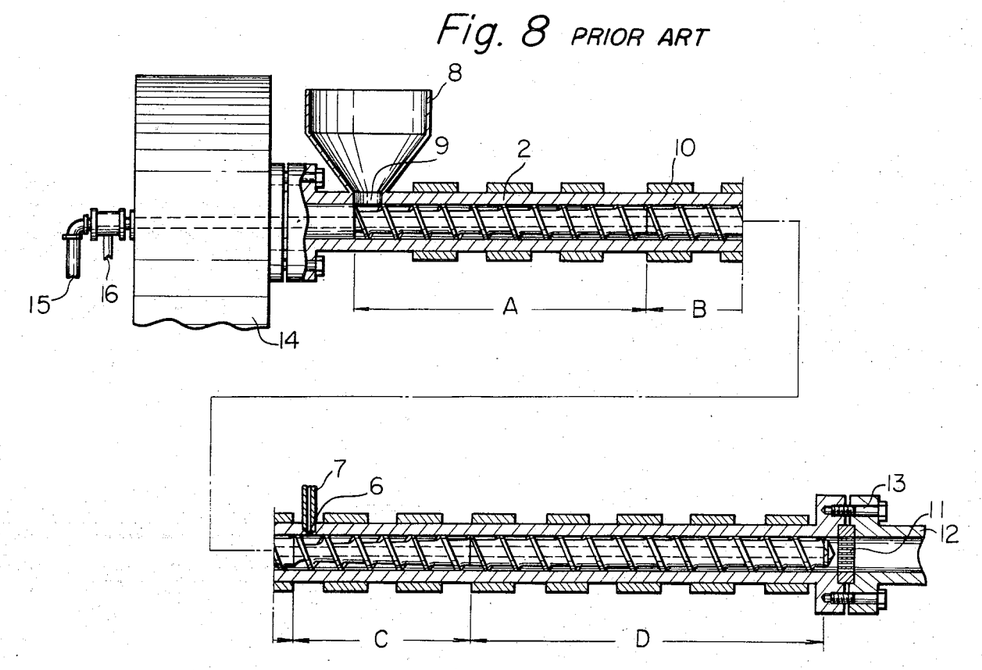
FIG. 8 is a transverse sectional view showing one example of the prior art extruder.

The well known method of producing a thermoplastic resin foam involves kneading and melting a thermoplastic resin within an extruder, adding a volatile organic liquid or gas as a blowing agent during kneading and melting, cooling the molten resin containing the blowing agent to a temperature suitable for foaming, and extruding the cooled resin through a die to foam it. The most frequently used type of extruder for the production of foams of this kind is described in Japanese Pat. Publication No. 15712/68 filed in Japan by De Bell & Richardson Inc., on the basis of U.S. Pat. Ser. No. 449,178 filed in the United States of America on April 19, 1965. This prior art extruder is illustrated in FIG. 8 of the accompanying drawings, and includes an extruder screw within an extruder barrel consisting of a compression zone A wherein a volume in unit pitch of the screw decreases progressively in the extruding direction, an intermediate metering zone B wherein a volume in unit pitch of the screw is equal to a volume in the last unit pitch of the screw in the compression zone, an enlarged zone C wherein a volume in unit pitch of the screw is larger than the volume in unit pitch of the screw in the intermediate metering zone, and a diminished metering zone D wherein a volume in unit pitch of the screw is equal to a volume in the final unit pitch of the compression zone, a blowing agent injection port being provided in the extruder barrel corresponding to the enlarged zone C. When a resin foam is to be produced using such an extruder, the molten resin in the enlarged zone undergoes a great resistance by the diminished metering zone adjacent to the enlarged zone, and stays at the enlarged zone C. The storage of the molten resin in the enlarged zone causes an irregular increase and fluctuation of pressure with the degree of storage. Consequently, the amount of a blowing agent varies considerably with changes in the amount of the molten resin extruded, making it difficult to produce a thermoplastic resin foam having a fine cellular structure and a uniform density and a uniform size.

Furthermore, when a thermoplastic resin is extruded and foamed by means of the known extruder, it is not easy to cool the entire resin uniformly to a temperature suitable for foaming, although when the output of the resin is relatively small, it is possible to lower the temperature of the resin by cooling the extruder barrel and screw. When the output of the resin becomes larger, mere cooling of the extruder barrel and screw is not enough to cool the resin to the desired foaming temperature, and it is almost impossible to maintain the entire molten resin uniformly at a temperature suitable for foaming; when the resin is extruded from a die, the gasified blowing agent escapes from the resin, resulting in a smaller ratio of expansion or a non-uniform foaming.

On the other hand, above-mentioned Japanese Pat. Publication No. 15712/68 based on U.S. Pat. Ser. No. 449,178 discloses a cylinder co-axially connected to the forward end of an extruder of the known type described above. A plurality of pipes opened at both ends are disposed within the cylinder in a direction at right angles to the extrusion direction, and adapted to cool the resin flowing in the cylinder to a temperature suitable for its foaming. When a resin foam is to be produced by using such a cooling device, the resin flowing in the cylinder undergoes a large resistance by the pipes opened at both ends, and considerable amounts of resin tend to become stagnant around said pipes. Because of this, it is difficult to extrude and foam the resin uniformly. Furthermore, because the resin undergoes resistance, too many pipes opened at both ends cannot be provided, and the area of contact between the resin and the pipes decreases; this naturally leads to a restricted cooling capacity. When the output the resin is increased, the resin cannot be throughly and uniformly cooled to the desired foaming temperature, and foams of good quality cannot be obtained.

Accordingly, one object of the present invention is to provide an extruding apparatus for producing a thermoplastic resin foam with fine cellular structure having a uniform density and a uniform size by injecting a volatile liquid or gas as a blowing agent into molten resin at a relatively low pressure and extruding the molten resin containing blowing agent while preventing variations in injection pressure and in output of the resin to be extruded.

Another object of the invention is to provide a cooling device for producing a thermoplastic resin foam with fine structure having a uniform density and a uniform size by cooling molten resin containing a volatile liquid or gas as a blowing agent to a temperature suitable for its foaming with good efficiency and overall uniformity, followed by extrusion.

Other objects and advantages of the present invention will become apparent from the following description.

The above objects can be achieved by using an extrusion apparatus including an extruder wherein an extruder screw is fitted with an extruder barrel and a blowing agent injection port is provided in a part of said extruder barrel, said extruder screw consisting of a compression zone in which a volume in unit pitch of the screw decreases progressively in the extrusion direction and a metering zone in which a volume in a unit pitch is 1.6 – 2.0 times a volume in the final unit pitch of the compression zone, said blowing agent injection port being provided at that part of the extruder barrel which corresponds to said metering zone. The above objects can also be achieved by using an extrusuion apparatus including an extruder having an extruder screw in an extruder barrel and a blowing agent injection port at a part of said extruder barrel, and a cooling device connected to the forward end of said extruder, said cooling device comprising a coolant vessel disposed co-axially with said extruder, a plurality of pipes for dividing the flow of resin spaced apart from each other and extending through the coolant vessel in the extruding direction from one wall plate to the other wall plate thereof, an adapter for dividing the flow of resin extruded from the extruder and cause it to flow through said pipes, and an adapter for gathering the flows of the resin from the pipes.

In the present invention, it is necessary that a volume in unit pitch of the screw in the metering zone should be 1.6 – 2.0 times a volume in the final unit pitch in the compression zone, and should be constant in the extrusion direction. This requirement has been found as a result of our theoretical and experimental studies of extrusion. If a volume in unit pitch of the screw in the metering zone exceeds two times a volume in the final unit pitch in the compression zone, it is difficult to maintain an output equilibrium of the resin between the compression zone and the metering zone, resulting in a fluctuation in output of the resin extruded. Thus, the amount of blowing agent to be injected also varies, and the resin cannot be kneaded well with the blowing agent. This naturally makes it impossible to form foams of good quality. On the other hand, if the volume in unit pitch of the screw in the metering zone is below 1.6 times the volume in the final unit pitch in the compression zone, it becomes difficult to maintain an output equilibrium of the resin between the compression zone and the metering zone, resulting in an undesirable rise in the pressure of the resin in the metering zone and the difficulty of injecting the blowing agent. Thus, the amount of the blowing agent to be injected varies, and foams of good quality cannot be obtained. Generally speaking, if the volume in unit pitch of the screw in the metering zone is in the vicinity of 1.6 times the volume in the final unit pitch of the screw in the compression zone, the apparatus is suited for the production of resin foams with low expansion ratio, whereas if it is in the vicinity of 2.0 times, the apparatus is suitable for the production of resin foams with high expansion ratio.

In the apparatus of the present invention, a volume in unit pitch of the screw in the compression zone decreases progressively in the extrusion direction in order to ensure a good kneading of the resin by heat-melting it while extruding it forwardly. The rear part of the compression zone is used as a feed section for the resin. The volume in unit pitch of the screw can be varied either by changing the depth of screw channel while maintaining the screw pitch constant, or by changing both the screw pitch and the depth of screw channel. The use of an extruder screw with constant pitch wherein a volume in unit pitch of the screw is determined by changing the depth of the screw channel, gives a smooth flow of the resin and leads to optimum results. Furthermore, this kind of extruding screw is easy to produce.

In general, the ratio of screw length ($L$) to screw diameter ($D$) is in the range of 30 – 40. $L/D$ in the compression zone is in the range of 14 – 25, and $L/D$ in the metering zone is in the range of 10 – 15. Compression ratio in the compression zone is in the range of 2 – 4.

In the apparatus of the invention, the injection port for a blowing agent is provided at a part of the exrruder barrel corresponding to the metering zone. The provision of the injection port an this place contributes to the ease of injecting a blowing agent, and maintains a constant rate of the blowing agent to be mixed with the resin. Furthermore, according to such a way of provision, the blowing agent does not flow back to the compression zone, and foams of good quality can be obtained. Especially good results will be obtained when the injection port for a blowing agent is provided at that part of the extruder barrel which corresponds to the first one-half to one pitch of the screw.

In one preferred embodiment of the present invention, an intermediate metering zone wherein a volume in unit pitch of the screw is equal to a volume in the final unit pitch of the screw in the compression zone is provided between the compression zone and the metering zone. The resin fed from the compression zone is stabilized in the intermediate metering zone and fluctuations in the injecting pressure of a blowing agent in the metering zone is lessened, thereby giving foams of goods quality. In general, the $L/D$ in the intermediate metering zone is 2 to 4.

In the apparatus of the present invention, a part of the metering zone may be replaced with a dulmage type mixing torpedo wherein a volume in unit pitch is equal to a volume in unit pitch of the screw in the metering zone. A blowing agent injected is uniformly mixed with the resin by means of the dulmage type mixing torpedo to give foams of good quality. The best results will be obtained if the first part of the metering zone is formed with this dulmage type mixing torpedo and a blowing agent is injected into this mixing torpedo. To the forward end of the extruder having the construction as described above, is connected any extrusion die of an optional shape such as sheets, plates, tubes, pipes, rods, or filaments.

In the cooling device provided in the extrusion apparatus of the invention, a box type vessel or a cylinder type vessel is used as the coolant vessel. In the case of using the box-type vessel, it is possible to fill the vessel with a suitable coolant such as water, oil and glycerine and control the temperature of the coolant to a constant temperature, or to provide an inlet and an outlet for the coolant in the vessel and circulate the coolant maintained at constant temperature from the inlet to the outlet. When a vessel of cylinder type is used, the construction may be such that both ends of the cylinder are closed by means of wall plates and a coolant maintained at a constant temperature is circulated from the inlet to the outlet for the coolant provided in the cylinder. Alternatively, a coolant jetting pipe having a plurality of openings for jetting out a coolant is provided along the central axis of the cylinder to extend from one wall plate to the other, and an inlet for the coolant which passes from both ends of the coolant jetting pipe, and through the inside of the wall plates and opens into the exterior is provided in the wall plates, while an outlet for the coolant is provided in the cylinder to open into the exterior; thus, a coolant maintained at constant temperature is caused to flow through the coolant jetting pipe, jetted out from a plurality of openings provided in the pipe, and circulated to the output of the coolant.

The coolant vessel further contains a plurality of pipes for dividing the flow of resin which extend in the extruding direction from one wall plate of the vessel to the other and disposed in spaced-apart relationship. Since these pipes are spaced apart from each other in the extruding direction, the resin flowing through the pipes does not undergo any resistance. The pipes for dividing the flow of the resin are cooled by the coolant present in the coolant vessel, and the resin flowing in the pipes is maintained at a temperature suitable for foaming.

The coolant vessel also includes an adapter for dividing a flow of resin extruded from the extruder into the pipes. The resin is smoothly divided into the pipes through the adapter. Another adapter for gathering the flows of resin extruded from the pipes for dividing the flow of resin is connected to the coolant vessel. The flows of the resin are smoothly gathered through the adapter.

The cooling device described above is connected to the forward end of the extruder, and a die of any known type is secured to the forward end of the cooling device to constitute the extrusion apparatus of the present invention.

The above-mentioned cooling device is for cooling the flow of resin divided by the pipes to a temperature suitable for foaming, and the cooling of the resin is accomplished with good efficiency. Since the divided flows of the resin are gathered later, it is possible to maintain the entire resin at the foaming temperature, and foams of good quality can be obtained. Furthermore, since larger amounts of the resin extruded from the extruder can be cooled and maintained at the desired foaming temperature, foams of the resin can be produced with good productive efficiency.

Examples of the thermopoastic resin to which the apparatus of the present invention can be applied include, for instance, polyethylene, polypropylene, polystyrene, polyvinyl chloride, ethylene/vinyl acetate copolymer, and ethylene/vinylchloride copolymer. The blowing agents are petroleum ether, propane, butane, pentane, hexane, monochlorodifluoromethane, dichlorodifluoromethane, dichlorotetrafluoroethane, monochloropentafluoroethane, etc and inert gas such as nitrogen gas, carbon dioxide.

The invention will be described in further detail with reference to the accompanying drawings in which.

Figure 1:
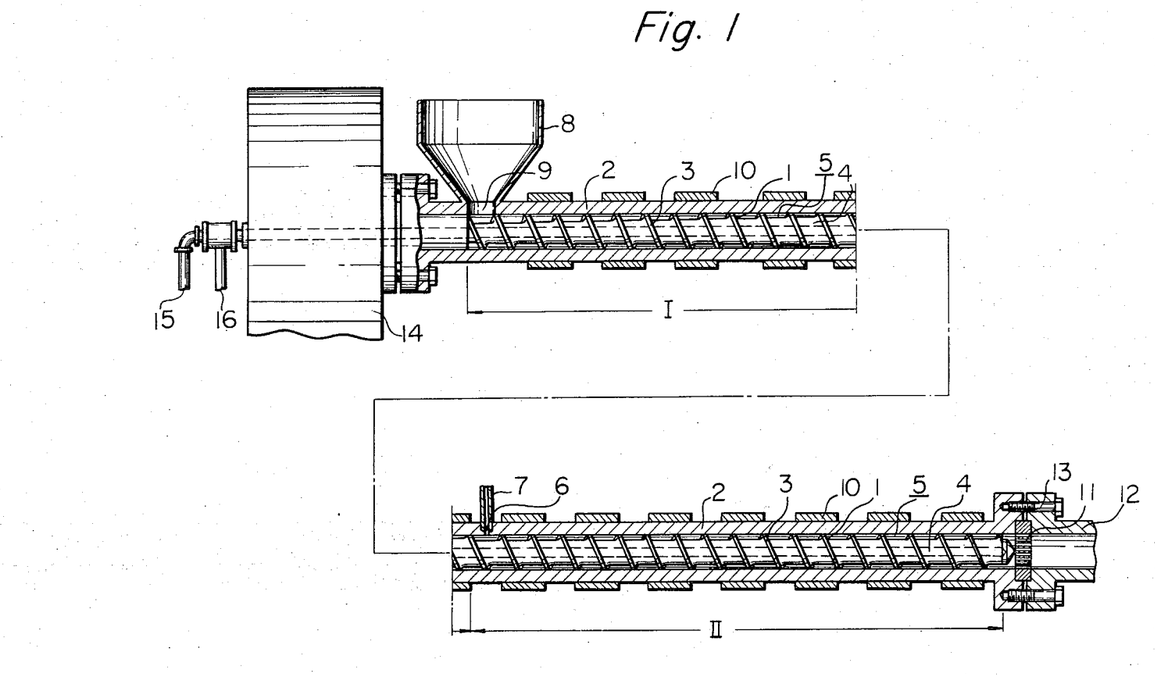
FIG. 1 is a vertical sectional view showing one example of the extruder used in the present invention.

Referring to FIG. 1, an 1 screw 1 is fitted in an extruder barrel 2. The extruder screw 1 has a screw flight 3, a screw root 4, and a screw channel 5, and consists of a compression zone I and and a metering zone II following the compression zone I. The extruder barrel 2 has a constant diameter along its length. The screw pitch in the compression zone I and the metering zone II is constant, respectively. The depth of screw channel in the compression zone I decreases progressively in the extruding direction, and the depth of screw channel in the metering zone II is 2.0 times that of the final screw channel of the compression zone I. Thus, a volume in unit pitch of the screw in the compression zone I decreases progressively in the extrusion direction. A volume of unit pitch of the screw in the metering zone Ii is constant within the range of 1.6 – 2.0 times a volume in the final unit pitch of the screw in the compression zone I and constant in the extrusion direction.

The injection port 6 is provided at that part of the extruder barrel which corresponds to the first ½-1 pitch of the metering zone II of the extruder screw 1. A blowing agent is injected through an injection tube 7. The clearance between the extruder diameter and the extruder barrel bore is generally in the range of 0.075 to 0.1 mm. A feed hopper is designated at 8, and the material is fed into the extruder through a feed opening 9. The extruder barrel can be heated by means of barrel heaters 10. The reference numeral 15 represents an inlet for cooling water to be supplied inside the extruder screw 1, and the numeral 16 represents its outlet. Towards the end of the extruder is located a breaker plate 11, and an adapter is secured to the flange of the extruder by means of a bolt 13 so as to connect an extrusion die to the forward end of the extruder.

Figure 2:
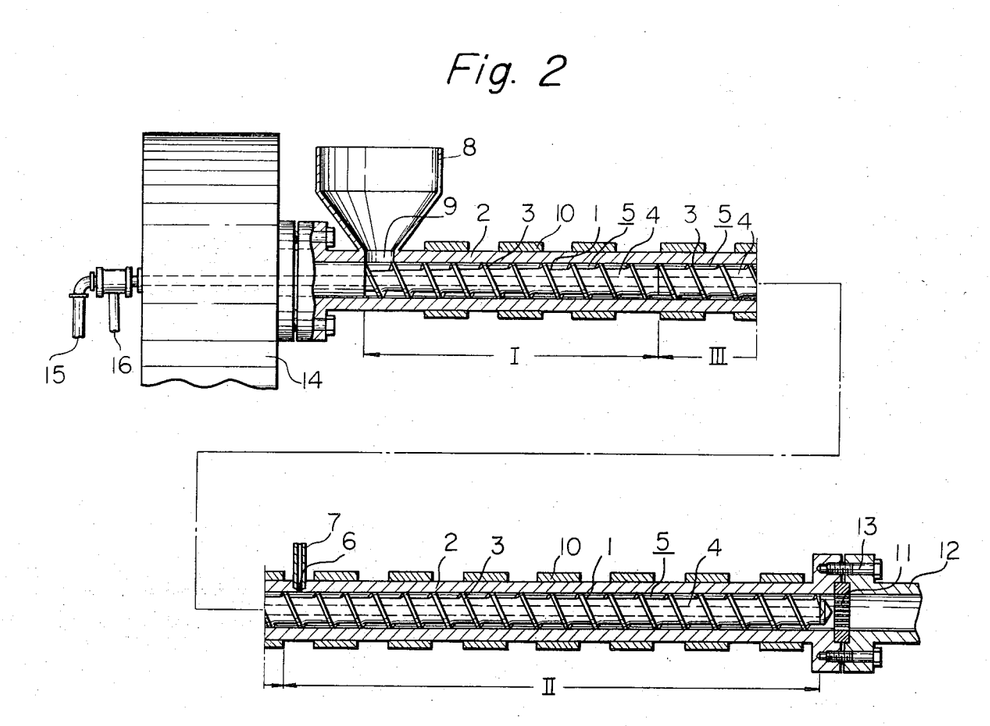
FIG. 2 is a vertical sectional view showing another example of the extruder used in the present invention.

In FIG. 2, an intermediate metering zone III is disposed between the compression zone I and the metering zone II of the screw 1. The screw pitch of the intermediate metering zone III is the same as the screw pitch of the compression zone I and the metering zone II, and is constant. The depth of screw channel in the intermediate metering zone III is equal to the depth of the last screw channel of the compression zone I. Consequently, a volume in unit pitch of the screw in the intermediate metering zone III is ewual to a volume in the final unit pitch of the screw of the compression zone I.

Figure 3:
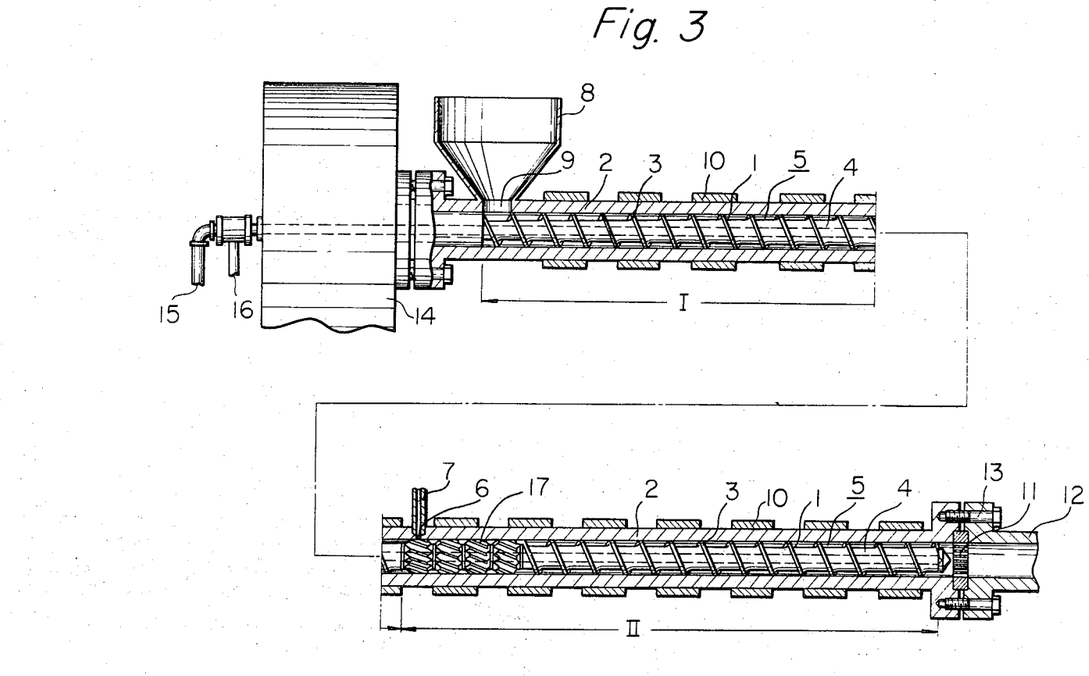
FIG. 3 is a vertical sectional view showing still another example of the extruder used in the present invention.
Figure 4:
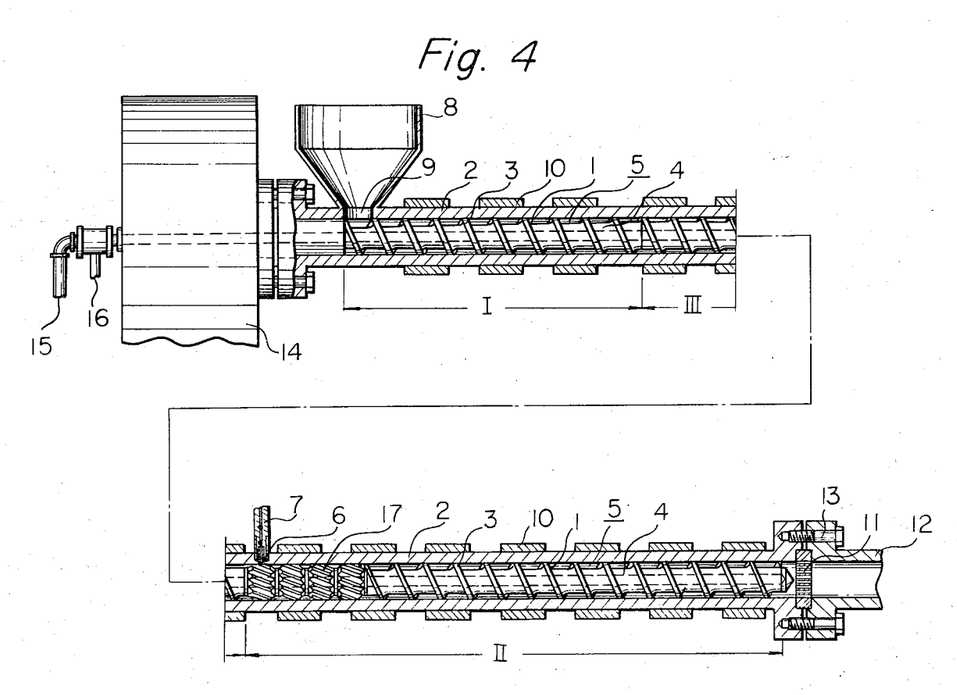
FIG. 4 is a vertical sectional view showing still another example of the extruder used in the present invention.
Figures 5, 6, 7:
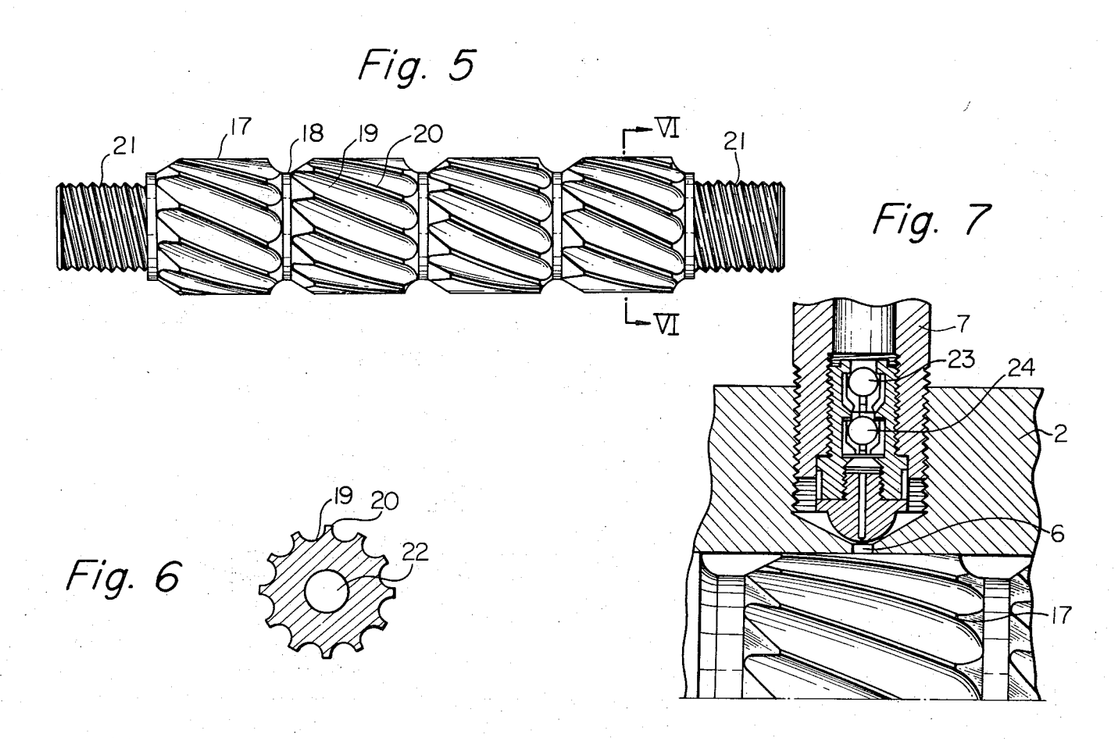
FIG. 5 is an enlarged elevational view showing the dulmage type mixing torpedo fitted in the extruder shown in FIG. 4.
FIG. 6 is a transverse sectional view taken along the line VI—VI of FIG. 5.
FIG. 7 is an enlarged transverse sectional view showing an injection port for a blowing agent provided in the extruder illustrated in FIG. 4.

Referring to FIG. 3, the first portion of the metering zone II of the extruder of the type illustrated in FIG. 1 is formed of a dulmage type mixing torpedo 17. In FIG. 4, the first portion of the metering zone of the extruder of the type disclosed in FIG. 2 is formed of a dulmage type mixing torpedo 17. As illustrated in FIGS. 5 and 6, the dulmage type mixing torpedo 17 has circumferential necks 18, rounded grooves 19, lands 20 between the grooves 19, and studs 21 for connecting the screw. The reference numeral 22 is a hole through which cooling water passes. A volume between one circumferential neck 18 and the subsequent circumferential neck 18 of the dulmage type mixing torpedo 17, i.e., a volume in unit pitch, is equal to a volume in unit pitch of the screw in the metering zone II.

The injection port 6 for supplying a blowing agent is provided at that part of the extruder barrel 1 which corresponds to the first ½-1 pitch of the dulmage type mixing torpedo. The injection tube 7 includes ball check valves 23 and 24, as shown in FIG. 7, for preventing the back flow of blowing agent injected.

Figure 9:
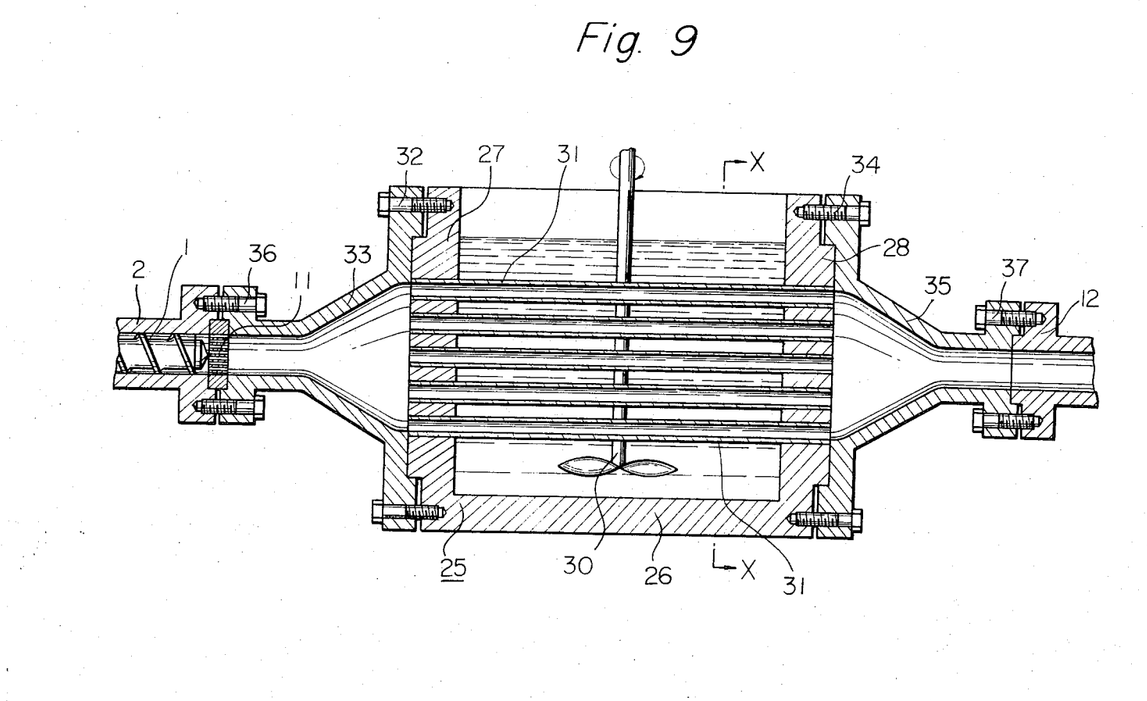
FIG. 9 is a vertical sectional view showing one example of the cooling device of the apparatus of the invention.
Figure 10:
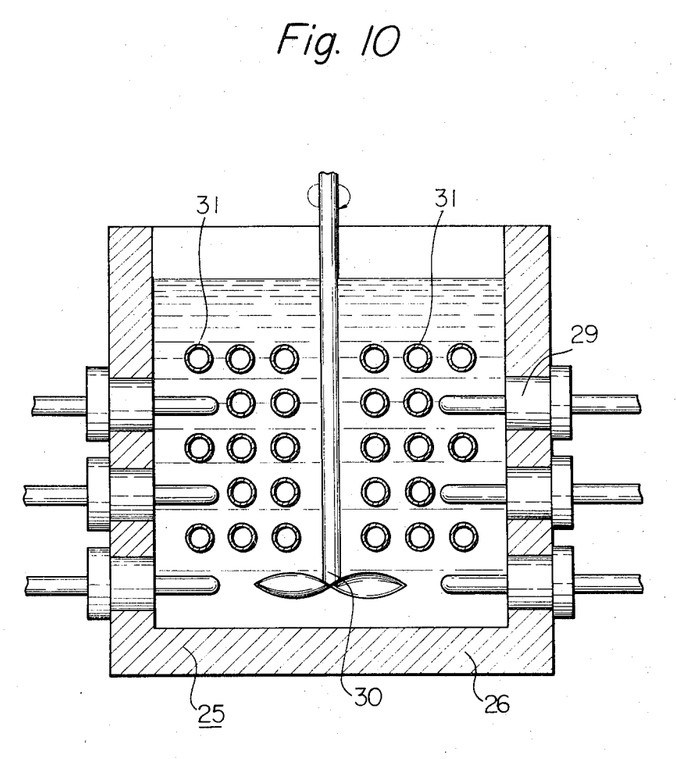
FIG. 10 is a transverse sectional view taken along the line X—X of FIG. 9.

In FIGS. 9 and 10, a cooling device is designated at 25. A coolant vessel 26 is disposed coaxially with the extruder and has side wall plates 27 and 28. Heaters 29 and an impeller 30 are provided within the coolant vessel 26 so as to maintain a coolant, such as water, oil and glycerine, filled in the coolant vessel 26 at a constant temperature. A plurality of pipes 31 for dividing the flow of molten resin extend in the extruding direction through the coolant vessel 26 from one wall plate 27 to the other wall plate 28, and are spaced at equal intervals. An adapter 33 is secured to the wall plate 27 by means of a bolt 32 for dividing the flow of molten resin extruded from the extruder and cause the divided flows to pass through the pipes 31. To the other plate 28 of the coolant vessel 26 is fixed an adapter 35 by means of a bolt 34 for gathering the flows of resin extruded from the pipes 31. The end of the adapter 33 is secured to the end of the extruder by means of a bolt 36. To the end of the adapter 35 is fixed an adapter 12 for connecting an extrusion die, by means of a bolt 37, and an extrusion die (not shown) is connected to the adapter 12.

Figure 11:
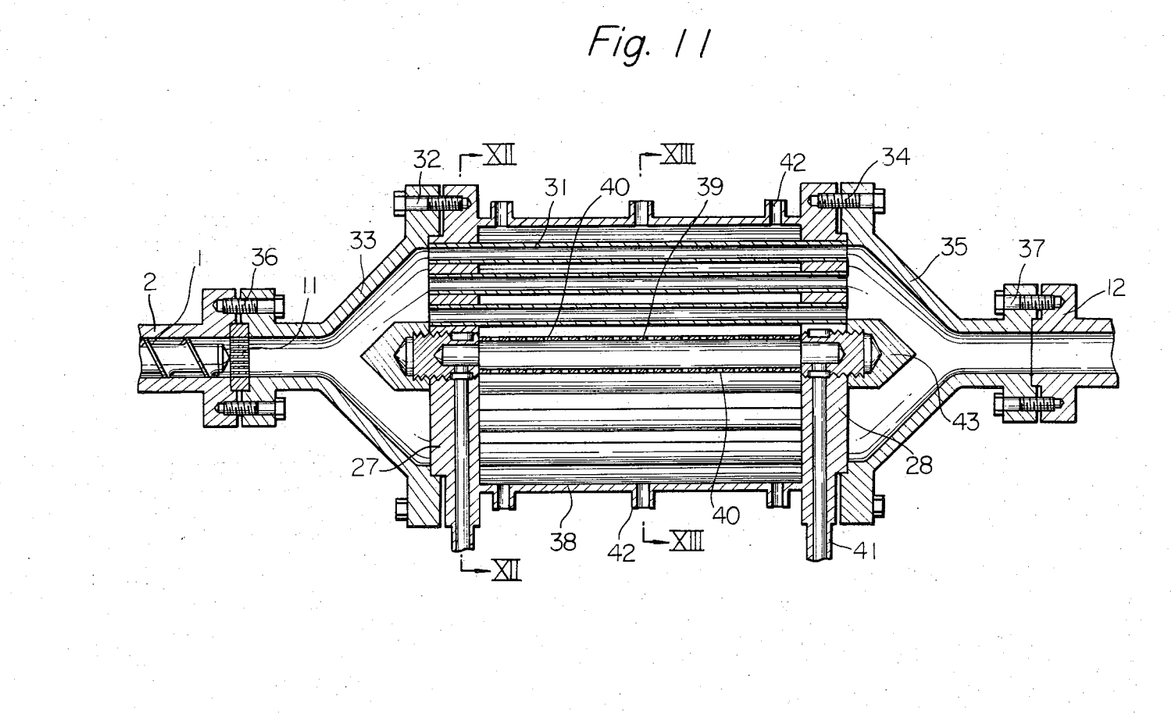
FIG. 11 is a vertical sectional view showing another example of the cooling device of the apparatus of the invention.
Figure 12:
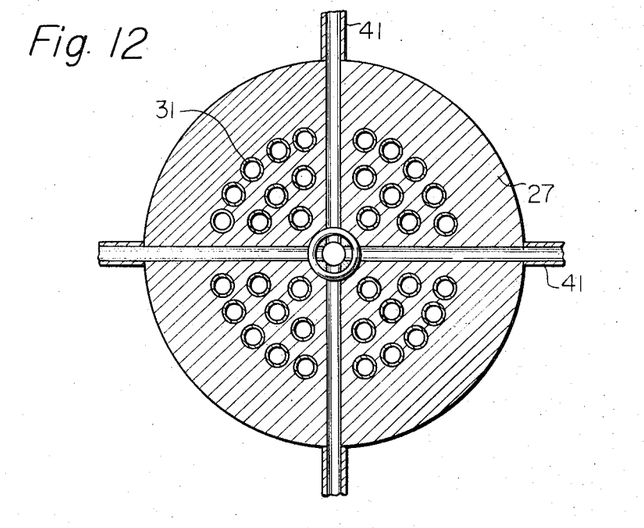
FIG. 12 is a transverse sectional view taken along the line XII—XII of FIG. 11.
Figure 13:
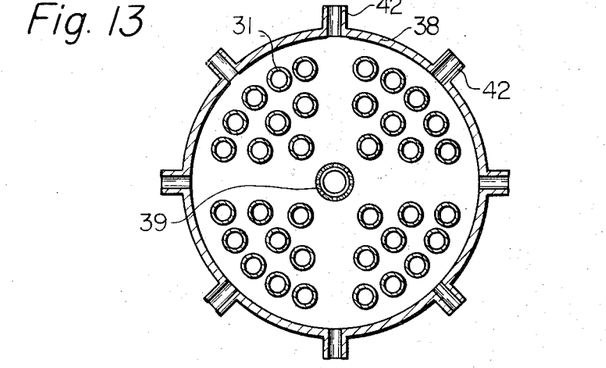
FIG. 13 is a transverse sectional view taken along the line XIII—XIII of FIG. 11.

FIGS. 11 to 13 show other examples of the cooling device. The reference numeral 38 represents a cylinder, both ends of which are closed with wall plates 27 and 28, respectively. A plurality of pipes 31 for dividing the flow of resin extend through the cylinder 38 in the extruding direction from the wall plate 27 to the other wall plate 28, and are spaced at equal intervals. A pipe 39 for jetting out a coolant having a jetting port 40 is disposed within the cylinder 38 along the central axis of the cylinder 38 and extends from the wall plate 27 to the other wall plate 28. An inlet for a coolant which extends from one end of the pipe 39 and through the wall plate 27 and opens into the outside is designated at 41, and the reference numeral 42 represents an outlet for the coolant which opens from the inside of the cylinder 38 into the outside thereof. A torpedo 43 is provided to smoothen the flow of resin. A coolant, such as water, oil, and glycerine, maintained at a predetermined temperature is fed to the coolant jetting pipe 39 from the inlet 41 and through the wall plates of the cylinder 38, and jetted out from the jetting apertures 40 into the inside of the cylinder 38 thereby to cool the pipes 31 at a predetermined temperature. The coolant is then circulated to the outlet 42.

Illustrative examples of the present invention will be given below.

EXAMPLE 1

The apparatus used in this Example had the following construction.

An extruder screw having a screw diameter of 65 mm, a constant screw pitch of 65 mm, an exial flight land width of 8 mm, and a helix angle of 17°40' is fitted in an extruder barrel having an inner diameter of about 65 mm. The extrusion screw consists of a tapered compression zone I having the depth of the first screw channel of 9 mm and the depth of the last screw channel of 3 mm and a length of 650 mm, an intermediate metering zone III following said compression zone I, which has a screw channel depth of 3 mm constantly along its length and a length of 260 mm, and a metering zone II following the intermediate metering zone, which has a screw channel depth of 6 mm and a length of 1,170 mm. An injection port for injecting a blowing agent is provided on that portion of the extruder barrel which corresponds to the first ½ pitch of the metering zone. An extrusion die having a nozzle with a diameter of 16 mm is fitted to the forward end of the extruder having the above-mentioned construction. This apparatus is of the type illustrated in FIG. 2 of the accompanying drawings.

Using the extrusion apparatus of the above construction, an intimate mixture of 100 parts by weight of low density polyethylene pellets having a melt index of 2.0 and 0.5 part by weight of talc was fed to the hopper of the extruder, and melted by heating at 140°C. in the compression zone I and the intermediate metering zone III. The speed of the extruder screw was adjusted to 20 rpm., and the molten mixture was transferred to the metering zone II by the rotation of the extrusion screw. Dichlorodifluoromethane was continuously injected from an injection port of the metering zone II at a rate of 20 percent by weight based on the molten mixture. The extruder screw and the extruder barrel were cooled with cooling water, and the temperature of the mixture in the metering zone II after the injection port was adjusted to near 110°C. which was within an optimum foaming temperature range. The mixture was extruded from the nozzle of the extrusion die to form a good quality foam having a circular section.

The injecting pressure of the blowing agent, output rate of the mixture, the extrusion temperature of the mixture, the density of the obtained foam, and the properties of the foam were measured, and the results obtained are shown in Table 1.

COMPARATIVE EXAMPLE 1

The procedure set forth in Example 1 was repeated except that there was used an apparatus of the type illustrated in FIG. 8 of the accompanying drawings which includes an extruder screw having a screw diameter of 65 mm, a screw pitch of 65 mm, an axial flight land width of 8 mm and a helix angle of 17°40', said extruder screw consisting of a tapered compression zone A having the first screw channel depth of 9 mm and the last screw channel depth of 3 mm and a length of 650 mm, an intermediate metering zone B following said compression zone I and having a constant screw channel depth of 3 mm and a length of 260 mm, an enlarged zone C consisting of a parallel portion having a constant screw channel depth of 10 mm and a length of 130 mm and a tapered portion following said parallel portion and having the first screw channel depth of 10 mm and the final screw channel depth of 4.5 mm and a length of 260 mm, and a metering zone D following said enlarged zone C and having a constant screw channel depth of 4.5 mm and a length of 780 mm.

The same measurements as in Example 1 were conducted with respect to the resulting foam product, and the results are shown in Table 1.

EXAMPLE 2

When the screw speed in Example 1 was made more than 40 rpm to increase the output of the resin mixture, the temperature of the mixture rose in spite of cooling of the extruder screw and barrel, and it was difficult to maintain the mixture at a temperature suitable for foaming. Accordingly, a cooling device of the type illustrated in FIG. 11 was fitted between the extruder and the extrusion die. The screw speed was adjusted to 60 rpm, and glycerine heated at 110°C. was circulated from the inlet to the outlet of the cooling device so as to cool a plurality of pipes having an inner diameter of 18 mm and a length of 750 mm for dividing the flow of the resin mixture. Thus, a foamed product of good quality was obtained.

The same measurements as set forth in Example 1 were conducted, and the results are shown in Table 1.

TABLE 1

|  | Comparative Example | Example 1 | Example 2 |
| --- | --- | --- | --- |
| Screw speed (r.p.m.) | 20 | 20 | 60 |
| Injection pressure of a blowing agent (kg/cm$^2$) | 80±5 | 55±2 | 70±2 |
| Output rate of the mixture (kg/hr.) | 15±1.5 | 15±0.3 | 40±1.2 |
| Extrusion temperature of the mixture (°C.) | 115 (at the outlet of the extruder) | 115 (at the outlet of the extruder) | 145 (at the outlet of the extruder) 114 (at the outlet of the cooling device) |
| Density of the foam (g/cm$^3$) | 0.060±0.005 | 0.040±0.002 | 0.035±0.002 |
| Properties of the resulting foam | Article size nonuniform with nonuniform coarse cells | Article size uniform with uniform fine cells | Article size uniform with uniform fine cells |

What is claimed is:

1. An extrusion apparatus for use in the production of a thermoplastic resin foam including an extruder comprising an extruder barrel, a continuous extruder screw fitted in said extruder barrel and an injection port for blowing agent provided in said extruder barrel, said extruder screw consisting of a compression zone wherein the volume in unit pitch of said screw decreases progressively in the extrusion direction and a metering zone wherein the volume in unit pitch of said screw is 1.6 – 2.0 times the volume in the final unit pitch of said screw in the compression zone and is constant in the extrusion direction, said injection port being provided at that portion of said extruder barrel which corresponds to the metering zone.

2. The extrusion apparatus of claim 1 wherein an intermediate metering zone in which the volume in unit pitch of the screw is equal to the volume in the final unit pitch of the screw of the compression zone is disposed between the compression zone and the metering zone.

3. The extrusion apparatus of claim 1 wherein the unit pitch of the screw in the compression zone and the metering zone is constant.

4. The extrusion apparatus of claim 2 wherein the unit screw pitch of the compression zone, intermediate metering zone and metering zone is constant.

5. The extrusion apparatus of claim 1 wherein said injection port for blowing agent is provided in that portion of the extruder barrel which corresponds to the first ½–1 pitch of the metering zone.

6. The extrusion apparatus of claim 2 wherein said injection port for blowing agent is provided in that part of the extruder barrel which corresponds to the first ½–1 pitch of the metering zone.

* * * * *

UNITED STATES PATENT OFFICE
CERTIFICATE OF CORRECTION

Patent No. 3,827,841      Dated August 6, 1974

Inventor(s) Isami KAWAI ET AL

It is certified that error appears in the above-identified patent and that said Letters Patent are hereby corrected as shown below:

In the Heading, insert patentees' foreign priority data as follows:

-- Japanese Application No. 50187/69, filed June 24, 1969, and Japanese Application No. 83124/69, filed October 16, 1969. --

Signed and sealed this 7th day of January 1975.

(SEAL)
Attest:

McCOY M. GIBSON JR.
Attesting Officer

C. MARSHALL DANN
Commissioner of Patents